(No Model.)

H. J. BREWER.
ELECTRIC BATTERY.

No. 535,090. Patented Mar. 5, 1895.

Witnesses
Anthony Gref
Wm. A. Pollock

Inventor

UNITED STATES PATENT OFFICE.

HORATIO J. BREWER, OF NEW YORK, N. Y.

ELECTRIC BATTERY.

SPECIFICATION forming part of Letters Patent No. 535,090, dated March 5, 1895.

Application filed May 2, 1892. Serial No. 431,438. (No model.)

*To all whom it may concern:*

Be it known that I, HORATIO J. BREWER, of New York, in the county and State of New York, have invented a certain new and useful Improvement in Electric Batteries, of which the following is a specification.

I will describe an electric battery embodying my improvement and then point the novel features in the claims.

Figure 1:
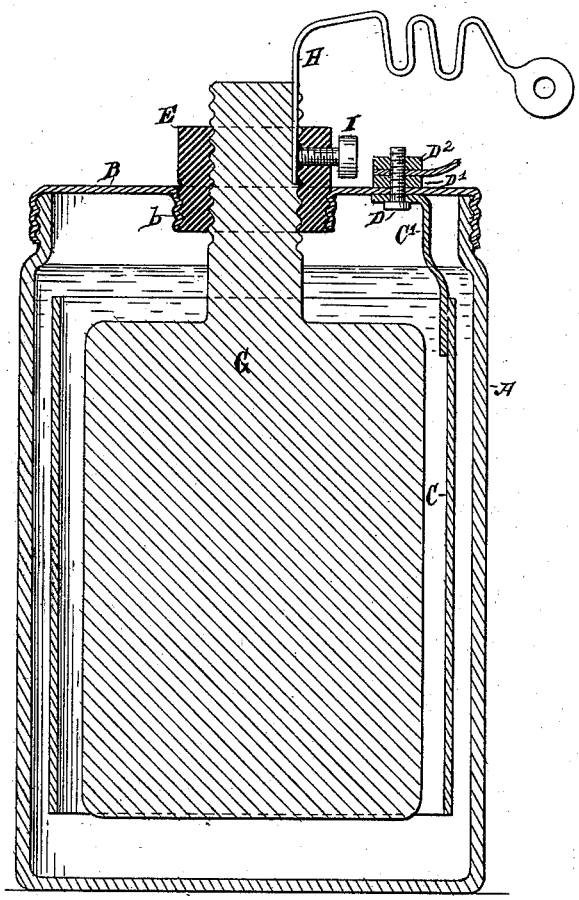
Figure 2:
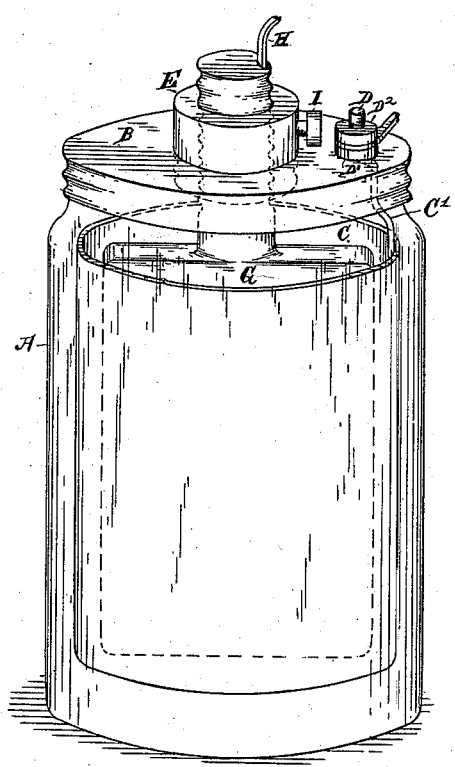

In the accompanying drawings, Figure 1 is a central vertical section of a battery embodying my improvement. Fig. 2 is a perspective view of the same.

Similar letters of reference designate corresponding parts in both figures.

A designates a cell which may be made of glass or any other suitable material and of any desired shape. To its upper end is applied a cover B. As here shown, the upper portion of the cell is reduced in size and provided with an external screw thread, and the cover is provided with a downwardly extended internally screw threaded flange. The cover will preferably be made of zinc.

C designates the positive element of the battery, which may consist of a cylinder of zinc. As here shown, this element is supported by a tang or strip C', here represented as made separately from it and fastened to it. The upper end of this tang or strip is fastened to the cover B, and in the present instance by means of a screw, D, made of zinc or other suitable metal passed upwardly through the tang or strip, and through the cover and having nuts D' D² applied to it above the cover. The nut D' fastens the screw and the tang or strip to the cover and the nut D² forms a means of clamping between it and the nut D' any conductor which is to be put into electrical communication with the positive element of the battery.

At the center, I have shown the cover B provided with a socket b which may be made of a flange extended downwardly. In this socket is fitted a block E, made partly or wholly of rubber or analogous material It is shown as externally and internally screw threaded. Its external screw thread engages with a screw thread in the socket b. Its inner screw thread engages with a screw threaded shank of conducting material extending upwardly from the negative element. The negative element is represented as made of carbon and its shank may advantageously be made of the same material. The block E serves to support the negative element within the cell A.

If the block E is only made partly of insulating material, and the cover of metal, the insulating material must be so disposed that the block will insulate the negative element from the cover B.

H designates a conductor communicating electrically with the shank of the negative element and extending therefrom. It may consist of a strip of tin. As here represented, it extends into the block E and fits between the latter and the shank of the negative element. A set screw I, made preferably of insulating material, extending into the block and impinging against this conductor fastens it in place. At the outer end, this conductor is shown as extended to form a ring which may be fastened by a screw clamp or otherwise to a circuit wire. It is obvious that the circuit wire may run directly to the element and be clamped to it by means of the set screw, but I prefer to interpose a piece of comparatively non-oxidizable metal such as tin.

By turning the shank of the negative element within the block E, or the latter within the cover B, such element must be adjusted vertically within the cell.

It will be seen that the block E forms a fastener of insulating material which, in connection with other parts, holds the metallic conductor in electrical connection with a battery element. The employment of a fastener of insulating material is advantageous, because among other things, it is not liable to corrosion, or oxidation, or to be attacked by the salts or acids of the battery.

Obviously, it is not essential that the cover B be made of metal. It may be made wholly or partly of metal or may be made entirely of insulating material if preferred. I do not wish to be restricted to any particular way of fitting or fastening the block E to the cover.

What I claim as my invention, and desire to secure by Letters Patent, is—

1. The combination with a battery element provided with a shank, of a cover for the battery cell, and a block of insulating material engaging by screw thread with the cover and fastened to the shank extending from and integral with said element, substantially as specified.

2. The combination with a battery element provided with a shank, of a cover for the battery cell, and a block of insulating material engaging by screw thread with the cover and engaging with said element by another screw thread formed upon the shank extending from said element, substantially as specified.

3. The combination with a battery element, of a cover for the battery cell, a block or part of insulating material supported by the cover, a shank extending from said element into this block or part, a conductor fitting within said block or part in electrical communication with said element and a set screw passing through said block or part and clamping the said strip of metal, substantially as specified.

4. In a battery, the combination of a cell, a cover for the cell, a positive element connected with a binding screw or connection extending through the cover, a block or part of insulating material extending upwardly from the cover, a negative element having a shank extending into the block or part of insulating material and a conductor fitting between said block or part of insulating material and shank, substantially as specified.

In testimony whereof I have signed my name to this specification in the presence of two subscribing witnesses.

HORATIO J. BREWER.

Witnesses:
ANTHONY GREF,
WM. A. POLLOCK.